(12) United States Patent
Rein et al.

(10) Patent No.: US 8,010,706 B1
(45) Date of Patent: Aug. 30, 2011

(54) METHOD OF AND SYSTEM FOR ENABLING OFFLINE APPLICATIONS

(75) Inventors: David Rein, Manlius, NY (US); Jesse Odom, New Rochelle, NY (US)

(73) Assignee: Purple Communications, Inc., Rocklin, CA (US)

( * ) Notice: Subject to any disclaimer, the term of this patent is extended or adjusted under 35 U.S.C. 154(b) by 829 days.

(21) Appl. No.: 10/212,862

(22) Filed: Aug. 5, 2002

(51) Int. Cl.
*G06F 15/16* (2006.01)

(52) U.S. Cl. ........................................ 709/250

(58) Field of Classification Search .................. 709/203, 709/219, 250
See application file for complete search history.

(56) References Cited

U.S. PATENT DOCUMENTS

| | | | | | |
|---|---|---|---|---|---|
| 5,727,159 | A | * | 3/1998 | Kikinis | 709/246 |
| 5,835,721 | A | * | 11/1998 | Donahue et al. | 709/224 |
| 6,070,184 | A | * | 5/2000 | Blount et al. | 709/200 |
| 6,163,779 | A | * | 12/2000 | Mantha et al. | 707/100 |
| 6,507,867 | B1 | * | 1/2003 | Holland et al. | 709/219 |
| 6,721,288 | B1 | * | 4/2004 | King et al. | 370/310 |
| 6,832,239 | B1 | * | 12/2004 | Kraft et al. | 709/203 |
| 6,839,562 | B2 | * | 1/2005 | Smith et al. | 455/466 |
| 6,845,091 | B2 | * | 1/2005 | Ogier et al. | 370/338 |
| 2004/0064570 | A1 | * | 4/2004 | Tock | 709/228 |

* cited by examiner

*Primary Examiner* — John Follansbee
*Assistant Examiner* — Alan S Chou
(74) *Attorney, Agent, or Firm* — Winston & Strawn LLP

(57) ABSTRACT

The present invention provides a method of enabling a web application independent of Internet coverage. The application operates within a service utilized by a client device and a server. Enabling the web application may include providing a plug-in application within the service; queuing up requests from the web application within the plug-in application; submitting the requests to the server during Internet coverage; and receiving a web response from the server to be sent to the web application through the plug-in application. A system for enabling a web application independent of Internet coverage is also provided. The system comprises a server including a processor and a memory and a client device including a processor and a memory having a plug-in application stored therein. The processor is capable of queuing up requests from the web application within the plug-in application, submitting the requests to the server during Internet coverage and receiving a web response from the server to be sent to the web application through the plug-in application.

42 Claims, 4 Drawing Sheets

METHOD OF AND SYSTEM FOR ENABLING OFFLINE APPLICATIONS

BACKGROUND

1. Field of the Invention

The present invention relates generally to wireless network services. In particular, the present invention relates to a method of and system for enabling the use of a wireless application on multiple wireless device platforms regardless of whether the wireless device is connected to a wireless network.

2. Description of the Prior Art

Lack of ubiquitous coverage of wireless networks often makes it impractical to roll out wireless applications to large workforces. While some members of the workforce may be in a wireless coverage area, others may not. Additionally, even members of the workforce who are in a wireless coverage area may occasionally find themselves without coverage, such as in a basement of a building or on an airplane.

Users of Go.Web™, a wireless service offered by GoAmerica, Inc., have found that although the ability to access and use wireless applications (e.g., Internet or World-Wide-Web applications) while in a wireless coverage area is beneficial, it would be even more beneficial if the same applications could be accessed and used when outside a wireless coverage area or inside a wireless coverage area where service is unavailable. A wireless application that can only be used when wireless service is available is of limited utility.

One solution to this problem is to create wireless applications that can be used when wireless service is unavailable. The problem with this solution is that the myriad of wireless devices in use today requires that multiple versions of the wireless applications be written, one for each wireless device platform. However, the costs associated with creating and maintaining multiple versions of the wireless applications is highly cost prohibitive.

A better solution, and the solution presented by the present invention, is to enable offline use of a wireless application wherein the wireless application is written independently of the operating systems of the wireless devices on which the application will be used.

SUMMARY OF THE INVENTION

In accordance with one embodiment of the present invention, a system is provided for enabling a web application independent of Internet coverage, the application operating within a service utilized by a client device and a server. The system includes the server including a processor and a memory and the client device including a processor and a memory having a plug-in application stored therein. The processor is configured to queue up requests from the web application within the plug-in application, submit the requests to the server during Internet coverage, and receive a web response from the server to be sent to the web application through the plug-in application. The requests can be queued up regardless of whether the client device is within Internet coverage or not. Preferably, the plug-in application generates the queues at the application level.

In accordance with another embodiment of the present invention, a method of enabling a web application independent of Internet coverage, the application operating within a service utilized by a client device and a server, is provided. The method includes the steps of providing a plug-in application within the service, queuing up requests from the web application within the plug-in application, submitting the requests to the server during Internet coverage, and receiving a web response from the server to be sent to the web application through the plug-in application.

It is to be understood that both the foregoing summary and the following detailed description of the present invention are exemplary and are intended to provide a description of, and not limit, the present invention.

The present invention will now be described in greater detail, with frequent reference being made to the drawings identified below, in which identical numerals represent identical elements.

DETAILED DESCRIPTION OF THE PREFERRED EMBODIMENT(S)

The following description is presented to enable any person of ordinary skill in the art to make and practice the present invention. Modifications to the preferred embodiment will be readily apparent to those of ordinary skill in the art, and the disclosure set forth herein may be applied to other embodiments and applications without departing from the spirit and scope of the present invention and the appended claims. Thus, the present invention is not intended to be limited to the embodiments described, but is to be accorded the broadest scope consistent with the claims appended hereto and the disclosure set forth herein.

Figure 1:
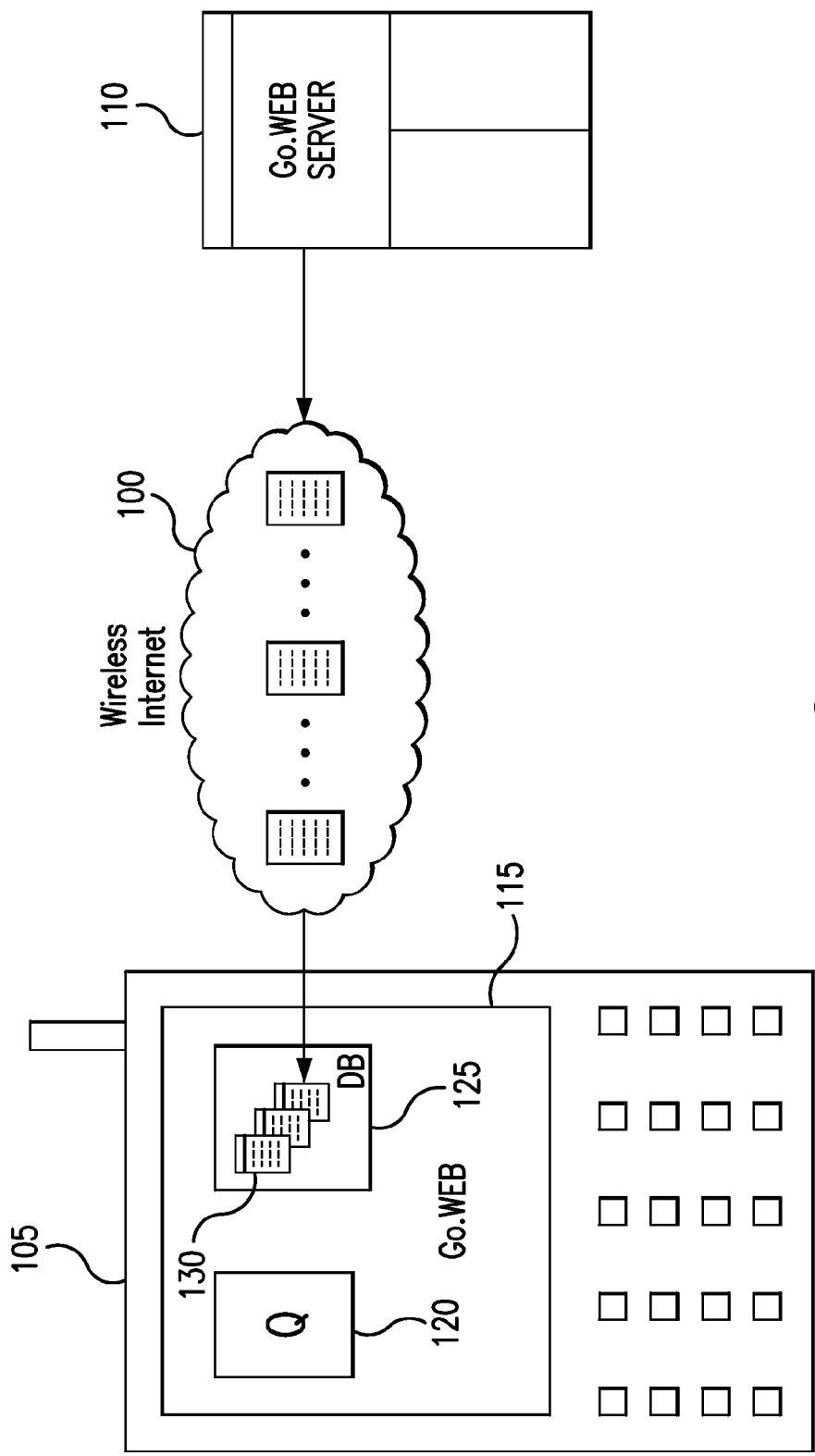
FIG. 1 is an illustrative diagram of a method and system in accordance with an embodiment of the present invention.
Figure 2:
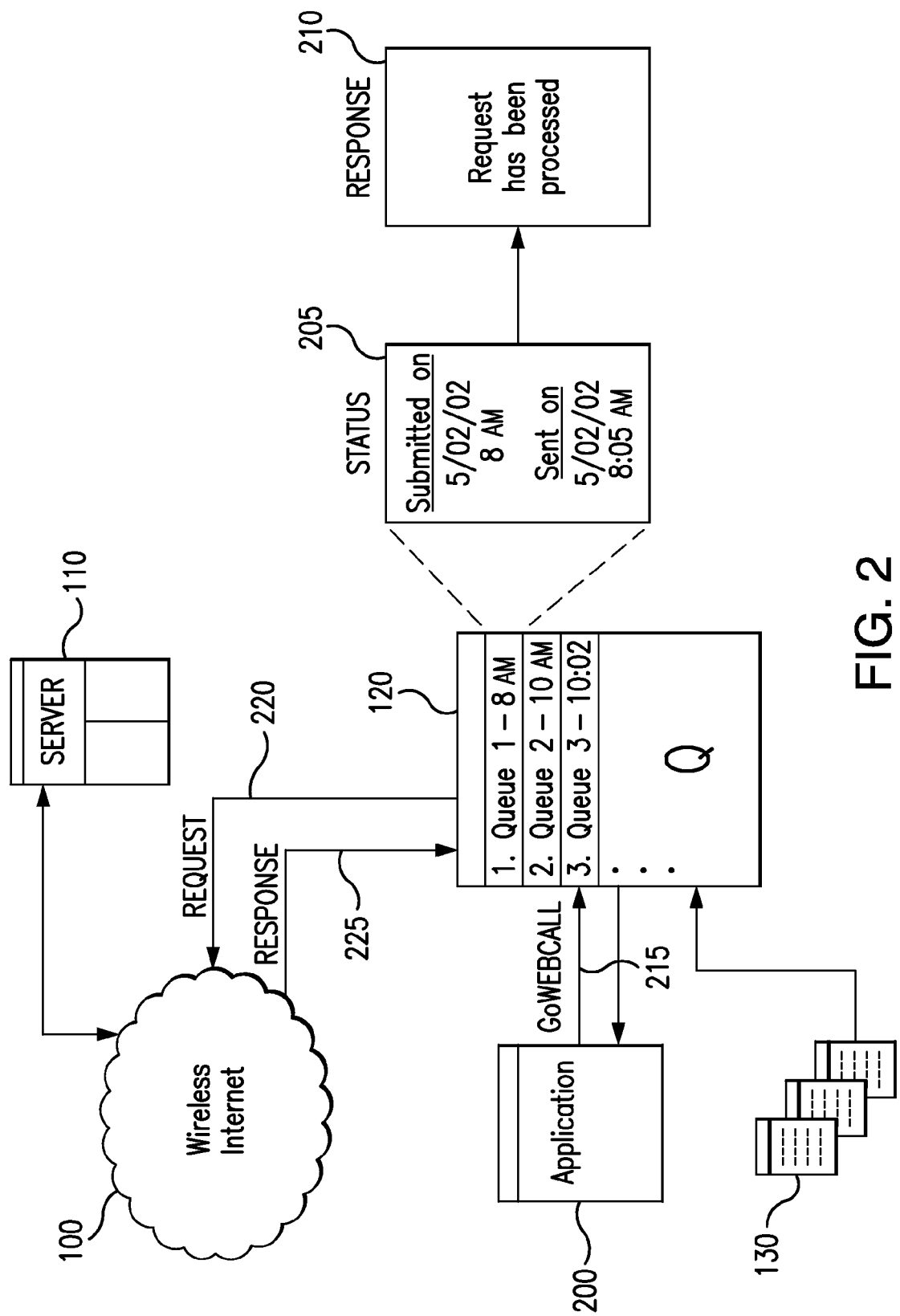
FIG. 2 is an illustrative diagram of a method and system in accordance with an embodiment of the present invention.
Figure 3:
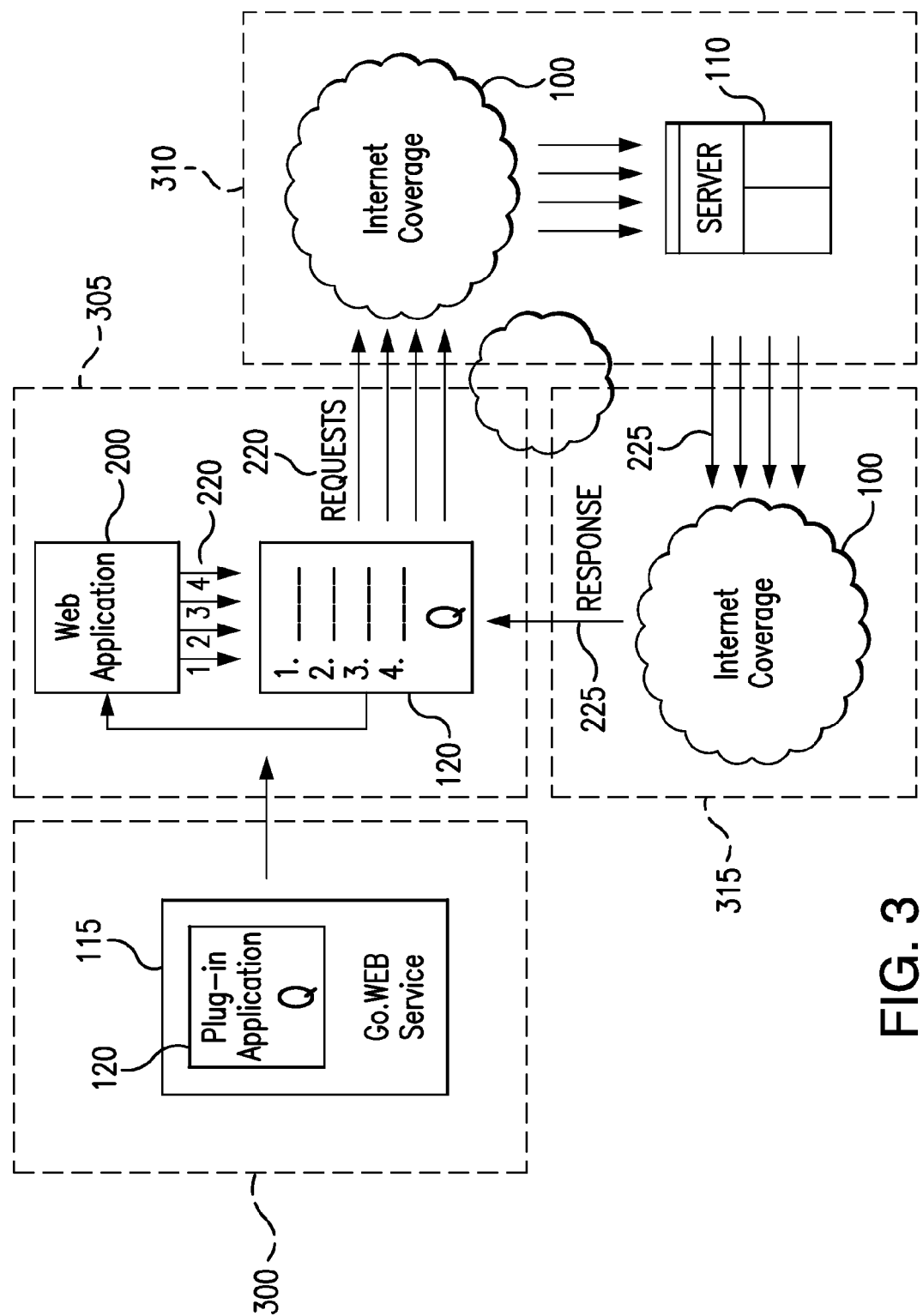
FIG. 3 is an illustrative diagram of a method and system in accordance with an embodiment of the present invention.

In accordance with one embodiment of the present invention, a method of using a wireless application independent of wireless coverage is illustrated in FIGS. 1-3. The wireless application 200 preferably operates within a service 115 utilized by a client device 105, such as a handheld Personal Digital Assistant (PDA) and a server 110 depicted in FIG. 1. One available service, the Go.Web™ service offered by GoAmerica, Inc., is used, although any wireless service may be used. The client device 105 can also be a cellular phone capable of handling handheld web applications or a laptop.

Referring to FIG. 3, the method of the present invention includes the first step 300 of providing a plug-in application 120 within the service 115. For example, the Go.Web Queue-Manager™ offered by GoAmerica, Inc. is a plug-in application that enables web developers to create web-based applications 200 that can be used regardless of how consistent the wireless coverage 100 is and regardless of the wireless device 105. During spotty or inconsistent wireless coverage the QueueManager™ enables users to use their web-based applications even within no-coverage or "dead" zones.

The second step 305 is to queue up requests 220 from the web application 200 within the plug-in application 120. In a preferred embodiment, application 120 can be called from any web-based application to queue up web requests 220 to be submitted when there is wireless coverage 100. This ensures that the web-based application 200 can be used in any coverage area and on any device. Web developers do not need to know anything about the underlying system on which the application will actually be run, as the plug-in application 120 manages the OS (Operating System) level details. Thus, a developer can create an application that is accessed via a service browser on any platform supported by the service 115 which can then be utilized whether the user is in coverage or not. The developer writes the application once, and it can be used on many platforms.

As mentioned above, the third step 310 is to submit the requests 220 to the server 110 during the Internet coverage 100. The requests can be submitted either through a wireless network or through a wired network. The wireless network may use the conventional IP protocol as its network protocol, or it may use another conventional communication protocol as its network protocol. For example, the wireless network could be a conventional Mobitex wireless network, which does not use the IP protocol as its network protocol, or the wireless network could be a conventional CDPD (Cellular Digital Pocket Data) wireless network, which uses the IP protocol as its network protocol.

Finally, the last step 315 is to receive a web response 225 from the server 110 to be sent to the web application 200 through the plug-in application 120 such as the QueueManager™.

In general, and in accordance with the preferred embodiments of the present invention the plug-in application 120 is a device 105 resident application for managing queuing of web requests when there are out of coverage situations. Preferably, the application accepts, queues and executes HTTP (HyperText Transfer Protocol) requests on behalf of another web application 200. In accordance with the preferred embodiment of the present invention, the plug-in application 120 interacts with handheld web applications, such as MobileClips™, and has the ability to view and cancel queued requests 220 as shown in FIG. 2. Requests 220 may be queued through HTML or Javascript commands 215 to the plug-in application 120.

MobileClips 130, which are mentioned above, are web-clipping applications that can be downloaded over the air 100. They are components of a web site stored locally on a wireless device 105 as illustrated in FIG. 1. In particular, MobileClips™ are a series of static HTML/WML pages that are compiled together to reside on a wireless device 105. Such components may include images, text and forms. Components are stored in client device's database 125 rather than in cache and can be accessed easily. MobileClips™ 130, i.e., components, are created on-the-fly on the Go.Web™ server 110 and downloaded over the air 100 to a wireless client device 105 as shown in FIG. 1.

According to another embodiment of the present invention, links in HTML-created web application content can invoke plug-in application 120 to submit a web request 220. Web form submissions are queued and executed in the background when coverage is available. Moreover, the plug-in application 120 enables the creation of applications that can be used in out-of-coverage situations. For example, MobileClips can be created in the same way any other HTML/WML page is created and invoke QueueManager. In such a case, QueueManager allows a developer to create a mobileclip that uses QueueManager. Therefore, the entire application can be used offline. Additionally, the request to QueueManager could be a call to download a new or updated mobileclip once the device is in coverage.

In accordance with the preferred embodiment of the present invention, the status 205 of web requests 220 can be viewed and a web page displaying response 210 is generated. The status 205 can comprise a request submission timestamp. The status 205 can comprise a sent-on timestamp. The web page displaying response 210 can comprise a display confirming whether the request has been processed.

For purposes of example only and not limitation, the plug-in application QueueManager™ 120 can be used with the following syntax: QueueMan (APP|DESC|LURL|URL) or QueueMan (view=[request|response][&app=appname]). The first command is used to create the queued request, the second is used to call to QueueManager to view the existing list of requests or to view the response from a specific application. The parameters are further explained in the table below:

| | |
|---|---|
| APP | Application 200 name, used for display purposes only. (Optional) |
| DESC | Description, used for display purposes only. (Optional) |
| LURL | Local URL for Go.Web ™ service 115. This tells the Go.Web browser to go to a URL after accepting a request 220. If not specified, QueueMan will display a popup indicating request was queued. (Optional) |
| URL | The actual URL to request. |
| View | Tells the QueueMan GUI (Graphic User Interface) to display by filtering upon pending requests or by application name. (Optional) |

In accordance with yet another embodiment of the present invention, a web application 130, such as MobileClips™, can be used in an out of coverage situation. Information can be entered in a form and passed to the plug-in application 120 which will queue it for submission when a user comes back in coverage.

For example, the submit button could contain the following action: <form action="gowebcall://QueueMan (Get Local Weather|Get Local Weather based on zip code|local_weather.mcp/thanks.html|http://www.yourcompany.com/get_weather.cgi" method=get>, wherein once the submit button is clicked, a "gowebcall" invoking QueueManager™ 120 to the server 110 is made using MobileClip application for getting local weather based on zip code. Once the user comes back into coverage, the request is passed along and "get_weather.cgi" script is executed on the server 110 to "get" the requested information. Preferably, an auto-reply 210 can be generated by putting the text in an HTML file that is packaged together with the MobileClip application 130.

In accordance with an embodiment of the present invention, on the home screen of the wireless handheld 105 a "QueueManager" icon can be clicked for display of the status of all submitted jobs. A "View Job Status" link can be included in a web page by using a "gowebcall" routine to pass appropriate parameters to the QueueManager™ 120. For example, a link <a href="gowebcall://QueueMan (view='Get Local Weather'"> can be used. Preferably, the job is completed when the user comes back in coverage. The complete job status with details can be viewed from various menu options such as "View Entry" or "View Details" screens.

Referring to FIG. 2, QueueManager™ 120 as discussed above is the plug-in application for Go.Web service 115 that allows web-based applications 200 to submit requests 220 to QueueManager™ 120 instead of directly to a back-end server 110. QueueManager™ 120 then submits the request 220 and receives the resulting web response 225. For example, if an application allows looking up the inventory on a certain item, QueueManager™ 120 would take the request 220 and submit it on behalf of the application 200 and receive the response 225 with the actual inventory.

In accordance with the preferred embodiment of the present invention, QueueManager™ 120 is invoked from within Go.Web™ service 115 from a web-based application 200 that has been coded to use QueueManager™ 120. To code a web-based (i.e., HTML/WML) application to use the QueueManager™ application 120, the Go.Web™ service 115 can be invoked from within the web-based application 200 by using simple HTML code according to Go.Web style guide which is well known in the art.

Finally, once the request has been submitted to QueueManager™, a user preferably can continue using Go.Web 115 (the browser) without waiting for a reply from the server 110. The Go.Web server 110 sees the requests 220 from the QueueManager™ 120 exactly the same as if they were coming from a Go.Web browser.

Figure 4:
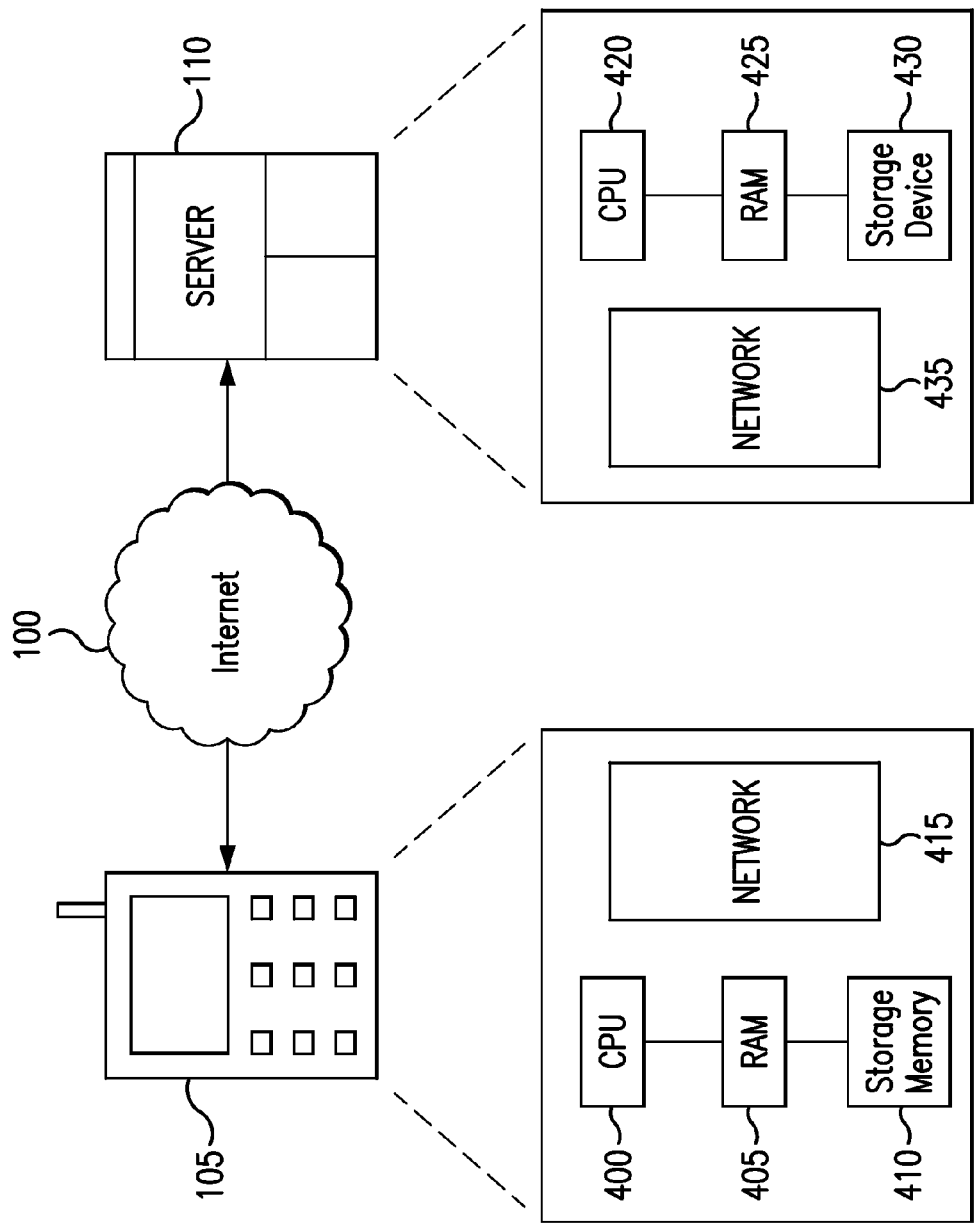
FIG. 4 is an illustrative diagram of a system in accordance with an embodiment of the present invention.

Referring now to FIG. 4, in accordance with the preferred embodiment of the present invention, a system is provided for enabling a web application independent of Internet coverage. The system includes a client device 105, such as a portable PDA capable of operating on a wireless network 100 using a network module 415. The network module 415 can be a wireless network card such as an AirCard which is well known in the art. The system further includes a server 110, which can be a Go.Web server, including a CPU (Central Processing Unit) 420 and a memory. Memory can include both Read Access memory (RAM) 425 and a storage device 430 in the form of a hard disk memory or storage media cards. The server 110 also includes a network module 435 for communicating with the network.

The client device 105 similarly includes a CPU 400 and a memory, storage memory 410 and RAM 405, having a plug-in application, such QueueManager™, stored therein. The processor 400 is capable of queuing up requests from the web application within the plug-in application, submitting the requests to the server during Internet coverage and receiving a web response from the server to be sent to the web application through the plug-in application.

As indicated above, the present invention relates generally to wireless network services. In particular, and without limitation, the present invention relates to novel features in the wireless Go.Web™ service, that is well known in the art, which is currently provided by GoAmerica™ However, those of ordinary skill in the art will appreciate that the present invention is not limited to use with Go.Web™ service and may be used within other Internet services.

In accordance with an alternative embodiment of the present invention, those of ordinary skill in the art will appreciate that the plug-in application of the present invention can be used as a standalone software application which can be loaded on any device to enhance its performance. The standalone software may be implemented, for example, on a personal digital assistant to complement pre-existing operable applications on the assistant such as applications for browsing, banking, games, etc. that involve wireless communications with the assistant.

Other techniques for implemented the features described herein may also be used.

Those of ordinary skill in the art will further appreciate that the present invention is not limited to any particular network or network protocol standards. However, it is particularly suited for use in wireless communications network in which network users interact with interactive applications on their wireless devices to benefit from different services (e.g., services other than voice communications).

In addition, the present invention is most useful in the environment where the connection to the Internet is spotty or erratic. For example, the techniques illustrated herein may be particularly useful when a mobile wireless communications device is operating in an area where a communications network for communicating with the device has been established (e.g., there is coverage) and device communications are lost, substantially degraded, or dropped for a variety of possible reasons. Typically, in such situations, user selections are lost when device communications are lost, substantially degraded, or dropped and the user has to repeat their selections shortly thereafter when communications established again. With the help of the plug-in application such as the QueueManager, which is typically stored on the client device, a client device user can now use his/her web applications without interruption and without having to repeat their selections. A queue that is generated during such communications situation may be used to wirelessly pass user selections or activity to the communications network. Every time the client device user comes back into coverage, depending on the existence of queues, the plug-in application serves as a communications link between the web applications stored on the client device and the wireless network. Such queues are generated by the plug-in application or other applications or modules that are specifically implemented to provide such features. However, such queues may exist in addition to any form of buffering that the operating platform or communications protocol that is provided by a user's wireless device.

It will be apparent to those skilled in the art that various modifications and variations can be made in the method and system of the present invention without departing from the spirit or scope of the invention. Thus, it is intended that the present invention include modifications and variations that are within the scope of the appended claims and their equivalents.

What is claimed is:

1. A method of enabling at least one operable application independent of Internet coverage, the operable application operating within at least one service utilized by a client device of a type of platform and a server, the method comprising:

providing a plug-in application within the service, the plug-in application configured to (a) operate on behalf of the operable application; (b) provide a scripting interface to the operable application usable across a plurality of different types of operable applications and different types of platforms, and (c) serve as a communications link and as a manager of operating system level details;

queuing up requests locally on the client device independent from the server, wherein the requests are queued from the operable application within the plug-in application regardless of whether the client device is within service coverage and regardless of whether the client device is in communication with the server;

when the client device is not within service coverage, selecting to provide one of the following responses based on a script used by the operable application to communicate with the scripting interface: (a) a generated auto-reply message indicating at least one of the requests were accepted; (b) a locally stored response to at least one of the requests, wherein the requests are for predefined resources; or (c) another locally stored response to at least one of the requests, wherein the requests include user modifiable inputs;

submitting the requests to the server during Internet coverage;

receiving a web response from the server to be sent to the operable application; and displaying a plurality of textual statuses of different types and at least one of the responses on the client device of at least one request in the queue, based on the queue that is generated locally by the client device, regardless of whether the client device is in communication with the server.

2. The method of claim 1, wherein the service is a wireless service.

3. The method of claim 1, wherein the operable application includes at least one web application and one non-web application.

4. The method of claim 1, wherein the operable and plug-in applications are stored and controlled on the client's device.

5. The method of claim 1, wherein the client's device is a wireless device.

6. The method of claim 1 wherein the plug-in application is invoked within the operable application and wherein a type of the operable application include browsing, weather querying, banking and gaming types.

7. The method of claim 1, wherein the operable application comprises an HTML or WML type application.

8. The method of claim 1, wherein said queuing up requests occurs when the client device is without Internet coverage.

9. The method of claim 1, wherein the receiving comprises receiving the web response through the plug-in application.

10. The method of claim 1, further comprising filtering the requests according to pending requests, an application name or a combination thereof.

11. The method of claim 1, wherein the displaying comprises displaying a status on the client device of at least one pending request in the queue.

12. The method of claim 1, wherein the displaying includes displaying an application name on the client device of at least one request in the queue.

13. The method of claim 1, wherein the status includes a sent-on timestamp.

14. The method of claim 1, wherein the status includes a request submission timestamp.

15. The method of claim 1, wherein the requests comprise at least one pending request and at least one completed request.

16. A system for enabling a web application independent of Internet coverage, the application operating within a service utilized by a client device and a server, the system comprising:
the client device including a processor and a memory having a plug-in application stored therein;
the processor being configured to:
queue up requests locally on the client device independent from the server, wherein the requests are queued from the web application within the plug-in application on behalf of the web application regardless of whether the client device is within service coverage and regardless of whether the client device is in communication with the server;
when the client device is not within service coverage, selecting to provide one of the following responses based on a script used by the web application to communicate with the scripting interface: (a) a generated auto-reply message indicating at least one of the requests were accepted; (b) a locally stored response to at least one of the requests, wherein the requests are for predefined resources; or (c) another locally stored response to at least one of the requests, wherein the requests include user modifiable inputs;
submit the requests to the server during Internet coverage;
receive a web response from the a server to be sent to the web application; and
generate a display on the client device comprising a list of statuses comprising textual information of at least one request in the queue, based on the queue that is generated locally by the client device, regardless of whether the client device is in communication with the server.

17. The method of claim 1 wherein the displaying comprises displaying the status with a corresponding request.

18. The method of claim 17 wherein the corresponding request comprises information representative of a web request.

19. The method of claim 1 wherein the displaying comprises displaying a list of requests and corresponding status information.

20. The method of claim 19 wherein the displaying comprises display a screen on the client device that includes the list.

21. The method of claim 1, further comprising:
providing a local web response from the client device to be sent to the web application in response to queuing, wherein the local web response comprises a web form, and wherein a submission request locally received into the web form is further queued locally for sending to the server for execution when the Internet coverage is available.

22. The system of claim 16, wherein the processor is further configured to filter the requests according to pending requests, an application name or a combination thereof.

23. The system of claim 16, wherein the service is a wireless service.

24. The system of claim 16, wherein the web application is coded to use the plug-in application.

25. The system of claim 16, wherein the web and plug-in applications are stored and controlled on the client's device.

26. The system of claim 16, wherein the client's device is a wireless device.

27. The system of claim 16, wherein the plug-in application is invoked within the web application.

28. The system of claim 16, wherein the web application is an HTML or WML type application.

29. The system of claim 16, wherein the processor is further configured to queue up requests when the client device is without Internet coverage.

30. The system of claim 16, wherein the processor receives the web response through the plug-in application.

31. The system of claim 16, wherein the displaying comprises displaying a status on the client device of at least one pending request in the queue.

32. The system of claim 16, wherein the displaying includes displaying an application name on the client device of at least one request in the queue.

33. The system of claim 16, wherein the status includes a sent-on timestamp.

34. The system of claim 16, wherein the status includes a request submission timestamp.

35. The system of claim 16, wherein the requests comprise at least one pending request and at least one completed request.

36. The system of claim 16 wherein the display comprises the status with a corresponding request.

37. The system of claim 36 wherein the corresponding request comprises information representative of a web request.

38. The system of claim 16 wherein the display comprises a list of requests and corresponding status information.

39. The system of claim 16 wherein the processor is further configured to:

provide a local web response from the memory to be sent to the web application in response to queuing and before receiving the web response, wherein the local web response comprises a web form, and wherein a submission request locally received into the web form is further queued locally for sending to the server for execution when the Internet coverage is available.

40. A non-transitory processor readable medium for enabling a web application on a client device independent of Internet coverage, wherein the medium comprises instructions executable by a processor to perform actions comprising:

putting in a queue a request locally on the client device independent from a server, wherein the request is queued from the web application regardless of whether the client device is within service coverage and regardless of whether the client device is in communication with the server;

when the client device is not within service coverage, selecting to provide one of the following local web responses based on a script used by the web application to communicate with the scripting interface: (a) a generated auto-reply message indicating the request was accepted; (b) a locally stored response to the request, wherein the request is for predefined resources; or (c) another locally stored response to at least one of the request, wherein the request includes user modifiable inputs;

providing a local URL for the local web responses retrievable from the client device to be sent to the web application in response to putting in the queue if the client device is without Internet coverage, wherein the local web response comprises a web form, and wherein a submission request locally received into the web form is further queued locally for sending to the server for execution when the Internet coverage is available; and receiving, during Internet coverage, a web response to the submission request to be sent to the web application.

41. The processor readable medium of claim 40, wherein the local web response comprises a plurality of locally stored web pages, wherein at least one of the web pages comprises a submit command configured to provide, when Internet Coverage is not available, at least one Local URL that links to at least one of the web pages.

42. The processor readable medium of claim 40, wherein the local web response comprise mobile clips that are downloaded onto the client device.

* * * * *